(12) United States Patent
Nagata et al.

(10) Patent No.: US 12,151,649 B2
(45) Date of Patent: Nov. 26, 2024

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Yu Nagata, Chofu (JP); Ibuki Shimada, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 258 days.

(21) Appl. No.: 17/881,105

(22) Filed: Aug. 4, 2022

(65) Prior Publication Data

US 2023/0047976 A1 Feb. 16, 2023

(30) Foreign Application Priority Data

Aug. 13, 2021 (JP) ................................ 2021-132071

(51) Int. Cl.
| | |
|---|---|
| *B60R 25/31* | (2013.01) |
| *B60R 25/24* | (2013.01) |
| *B60R 25/30* | (2013.01) |
| *B60R 25/32* | (2013.01) |
| *B60W 60/00* | (2020.01) |

(52) U.S. Cl.
CPC ............ *B60R 25/31* (2013.01); *B60R 25/245* (2013.01); *B60R 25/305* (2013.01); *B60R 25/32* (2013.01); *B60W 60/001* (2020.02); *B60R 2325/10* (2013.01)

(58) Field of Classification Search
CPC ..... B60R 25/31; B60R 25/245; B60R 25/305; B60R 25/32; B60R 2325/10; B60W 60/001
See application file for complete search history.

(56) References Cited

U.S. PATENT DOCUMENTS

| | | | | |
|---|---|---|---|---|
| 5,281,949 A * | 1/1994 | Durley | ................ | G01S 13/931 |
| | | | | 340/901 |
| 6,472,836 B1 * | 10/2002 | Uebelein | .............. | H02H 7/0851 |
| | | | | 318/434 |
| 7,703,835 B2 * | 4/2010 | Weeda | ...................... | B60P 3/20 |
| | | | | 296/146.1 |
| 8,892,302 B1 * | 11/2014 | McDonald | ............ | G08B 21/22 |
| | | | | 701/36 |
| 10,699,634 B2 * | 6/2020 | Hayashi | ............... | G09G 3/3233 |
| 11,954,616 B2 * | 4/2024 | Sui | ........................... | G06F 13/42 |
| 2005/0273219 A1 * | 12/2005 | Kitao | ...................... | B60R 25/00 |
| | | | | 701/2 |

(Continued)

FOREIGN PATENT DOCUMENTS

| | | | |
|---|---|---|---|
| CN | 105654234 A | * | 6/2016 |
| JP | 2020-061120 A | | 4/2020 |

*Primary Examiner* — Chico A Foxx
(74) *Attorney, Agent, or Firm* — Sughrue Mion, PLLC

(57) ABSTRACT

An information processing apparatus is mounted in a delivery automatic driving vehicle with a monitoring device for remote monitoring. The information processing apparatus includes a controller that suppresses a monitoring function of the monitoring device when determining that a delivery person does not exist inside the automatic driving vehicle in a stopped state of the automatic driving vehicle.

21 Claims, 6 Drawing Sheets

(56) References Cited

U.S. PATENT DOCUMENTS

| | | | |
|---|---|---|---|
| 2006/0202809 A1* | 9/2006 | Lane | G06Q 10/08 |
| | | | 340/438 |
| 2008/0036238 A1* | 2/2008 | Weeda | B60P 3/20 |
| | | | 296/146.1 |
| 2008/0140400 A1* | 6/2008 | Blass | G10L 15/22 |
| | | | 704/E15.04 |
| 2008/0157510 A1* | 7/2008 | Breed | E05F 15/43 |
| | | | 701/45 |
| 2011/0224870 A1* | 9/2011 | Tan | H04M 1/6091 |
| | | | 701/36 |
| 2015/0278759 A1* | 10/2015 | Harris | G06Q 10/08355 |
| | | | 705/338 |
| 2016/0098876 A1* | 4/2016 | Oz | G07C 5/008 |
| | | | 340/5.61 |
| 2017/0323259 A1* | 11/2017 | Gillen | H04W 12/08 |
| 2017/0323545 A1* | 11/2017 | Gillen | G06Q 10/0631 |
| 2018/0065504 A1* | 3/2018 | Lan | B60W 10/30 |
| 2018/0164809 A1* | 6/2018 | Moosaei | G05D 1/0088 |
| 2019/0176754 A1* | 6/2019 | Kaneichi | G06Q 10/08 |
| 2019/0176760 A1* | 6/2019 | Uenoyama | B60R 25/305 |
| 2019/0182457 A1* | 6/2019 | Kanaoka | H04N 7/188 |
| 2019/0188637 A1* | 6/2019 | Endo | G06T 1/0007 |
| 2019/0205818 A1* | 7/2019 | Sakurada | G06Q 10/02 |
| 2020/0224466 A1* | 7/2020 | Kamata | G07C 9/00571 |
| 2021/0056774 A1 | 2/2021 | Arai et al. | |
| 2022/0114817 A1* | 4/2022 | Gronau | G06V 10/82 |
| 2022/0203917 A1* | 6/2022 | Lisseman | G06V 40/10 |
| 2023/0266145 A1* | 8/2023 | Salter | G01C 21/387 |
| | | | 701/532 |
| 2024/0126292 A1* | 4/2024 | Yoneda | G06Q 10/0637 |

* cited by examiner

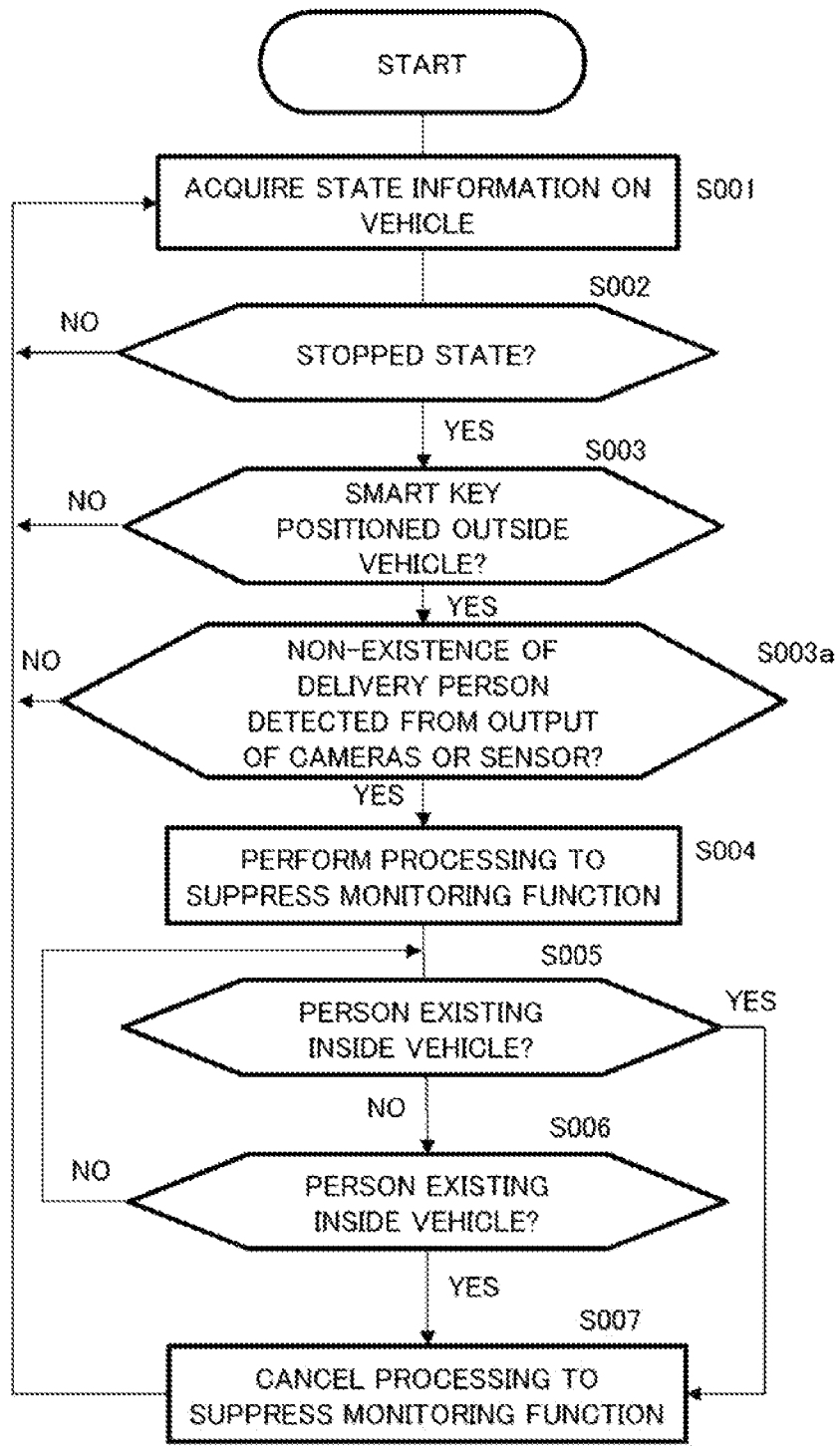

INFORMATION PROCESSING APPARATUS, INFORMATION PROCESSING METHOD, AND NON-TRANSITORY STORAGE MEDIUM

CROSS REFERENCE TO THE RELATED APPLICATION

This application claims the benefit of Japanese Patent Application No. 2021-132071, filed on Aug. 13, 2021, which is hereby incorporated by reference herein in its entirety.

BACKGROUND

1. Technical Field

The present disclosure relates to an information processing apparatus, an information processing method, and a non-transitory storage medium.

2. Description of the Related Art

Conventionally, a method for determining monitoring priority about a vehicle on the basis of vehicle information acquired from the vehicle to be monitored by a monitoring person and determining presentation information for monitoring the vehicle on the basis of the monitoring priority has been known (for example, Japanese Patent Application Laid-open No. 2020-61120).

SUMMARY

The present disclosure has an object of providing an information processing apparatus, an information processing method, and a program that make it possible to reduce a burden on a remote monitoring person.

An aspect of the present disclosure provides an information processing apparatus mounted in a delivery automatic driving vehicle with a monitoring device for remote monitoring. The information processing apparatus includes a controller that suppresses a monitoring function of the monitoring device when determining that a delivery person does not exist inside the automatic driving vehicle in a stopped state of the automatic driving vehicle.

Other aspects of the present disclosure may include an information processing method having the same characteristics as those of the above information processing apparatus, a computer program, a non-transitory storage medium on which a computer program is recorded, an information processing system, or the like.

According to the present disclosure, it is possible to reduce a burden on a remote monitoring person by the suppression of a monitoring function.

BRIEF DESCRIPTION OF THE DRAWINGS

FIG. 6 is a flowchart illustrating an operation example 3.

DESCRIPTION OF THE EMBODIMENTS

An information processing apparatus according to an embodiment is mounted in a delivery automatic driving vehicle with a monitoring device for remote monitoring. Further, the information processing apparatus includes a controller that suppresses the monitoring function of the monitoring device when determining that a delivery person does not exist inside the automatic driving vehicle in the stopped state of the automatic driving vehicle.

As a result of the suppression of the monitoring function, information used by the monitoring person to perform monitoring is suspended or the amount of provided information for monitoring is reduced. Thus, it is possible to reduce a burden on the monitoring person when performing monitoring.

Hereinafter, an information processing apparatus, an information processing method, and a program according to the embodiment will be described with reference to the drawings. The configurations of the embodiment are given as an example. The configurations of the embodiment may be appropriately combined together where necessary.

Configuration of Information Processing System

Figure 1:
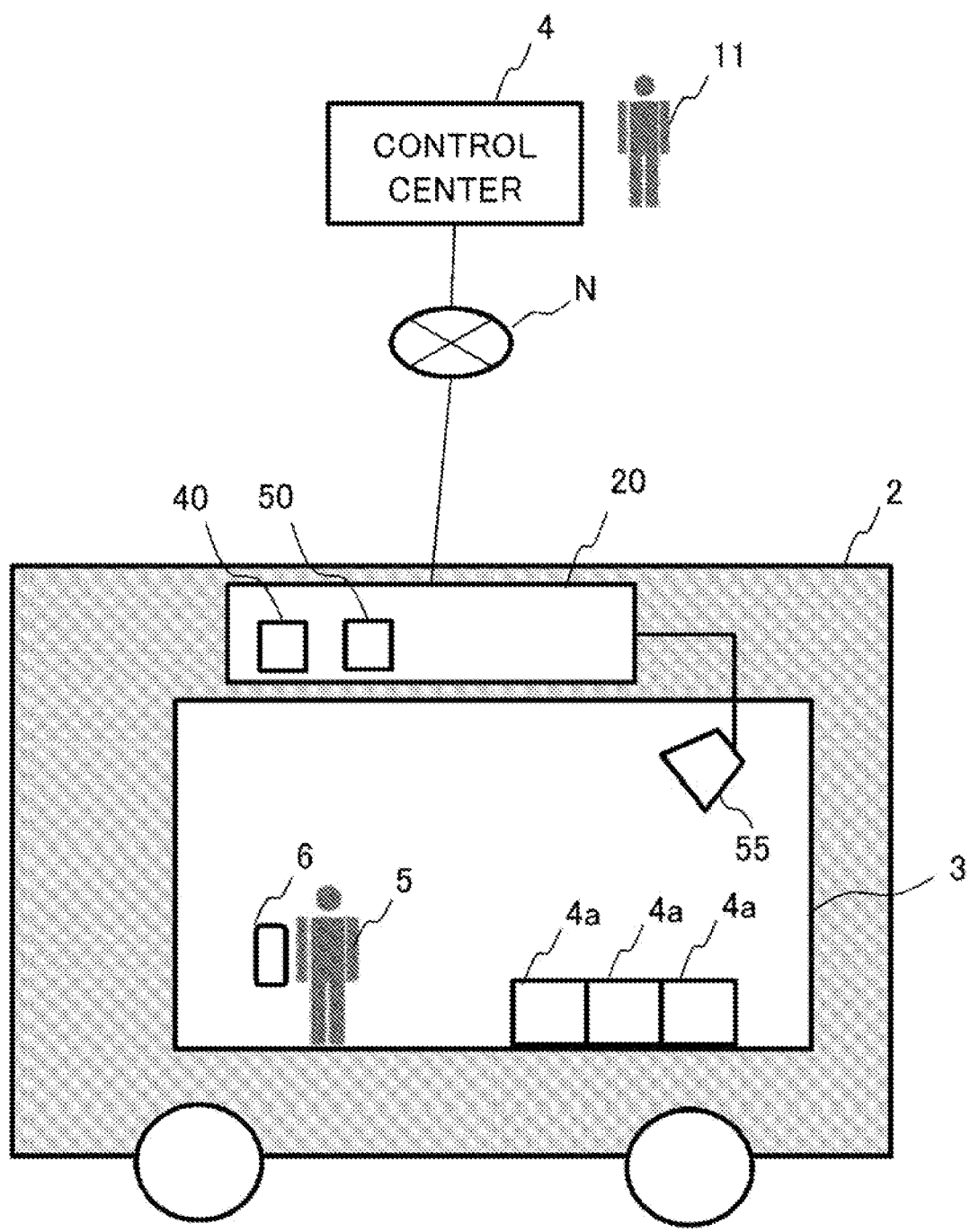
FIG. 1 is a diagram illustrating a configuration example of an information processing system according to an embodiment.

FIG. 1 is a diagram illustrating a configuration example of an information processing system according to the embodiment. In FIG. 1, the information processing system has a vehicle 2 and a computer of a control center 4 (hereinafter denoted as a "control center 4"). The vehicle 2 is equipped with a vehicle-mounted information processing system 20. The vehicle-mounted information processing system 20 and the control center 4 are connected via a network N and able to communicate with each other. The vehicle-mounted information processing system 20 is an example of an "information processing apparatus."

The network N includes a wired network and a wireless network. The wired network is also called, for example, a core network, a backbone, or the like and is a broadband network exemplified by an optic fiber network or the like. The wireless network includes, for example, a mobile phone network exemplified by a Long Term Evolution (LTE), a fifth-generation mobile communication system (5G), a sixth-generation mobile communication system (6G), or the like.

The vehicle 2 is a delivery automatic driving vehicle. In the present embodiment, the vehicle 2 is a vehicle (fully automatic driving vehicle) of fully automatic driving (automatic driving level 5). However, the vehicle 2 is not necessarily a fully automatic driving vehicle but an occupant may ride on the vehicle 2. The vehicle 2 may be driven by an engine or a motor.

The control center 4 is configurable by a dedicated or general-purpose computer such as a server machine, a personal computer, and a workstation. The control center 4 manages the respective driving, maintenance, or the like of a vehicle to be managed and monitored including the vehicle 2. The control center 4 generates, for example, an operation schedule such as an operation start time, operation, an operation end time, and a maintenance time zone of the vehicle 2 that is periodically operated. The control center 4 updates the operation schedule at an appropriate time, distributes the updated operation schedule to the vehicle 2, and manages the operation of the vehicle 2. The vehicle 2 is able to perform automatic driving according to the operation schedule and go around one or two or more delivery destinations.

Inside the vehicle 2, there is a cargo room 3 in which delivery baggage is accommodated. In the cargo room 3, baggage 4a to be delivered is accommodated. In the cargo room 3, a delivery person 5 who receives the baggage 4a and delivers the same to a recipient rides. When the vehicle 2 stops at a prescribed position, the delivery person 5 leaves the vehicle 2 with the baggage 4a, moves to a delivering place, and delivers the baggage 4a to the recipient.

The delivery person 5 holds a smart key 6. The vehicle-mounted information processing system 20 includes a smart key system 40. The smart key 6 transmits radio waves to the smart key system 40 when receiving radio waves transmitted from the smart key system 40. For example, when the electric field strength or received power of the radio waves from the smart key 6 becomes lower than a prescribed level, the smart key system 40 determines that the smart key 6 has moved to the outside of the vehicle 2 and locks a door of the vehicle 2. Further, the smart key system 40 turns off the driving source (such as the engine and the motor) of the vehicle 2. On the other hand, when the electric field strength or received power of the radio waves from the smart key 6 becomes the prescribed level or higher, the smart key system 40 is put into a state in which the smart key is allowed to unlock the door and turn on the driving source. Thus, the delivery person 5 is not required to perform the unlocking and locking operations of the door and turn off the driving source when leaving the vehicle 2 to deliver the baggage 4a. Note that the smart key 6 may be a dedicated smart key device or a smart device (such as a smart phone or a tablet device) in which a smart key function is installed.

The vehicle-mounted information processing system 20 notifies the control center 4 of information on automatic driving at an appropriate timing. The information on automatic driving includes information (such as the position of the vehicle 2) that is collected and recognized by the vehicle-mounted information processing system 20 to perform automatic driving and information indicating a determination based on recognized information, the content of control performed by a traveling mechanism on the basis of a determination result, or the like. A monitoring person 11 for the vehicle 2 refers to information transmitted to the control center 4 and monitors abnormality or the like in the automatic driving of the vehicle 2. The generation and notification of the information on automatic driving described above may be or may not be performed by a monitoring device 50 (FIG. 2) included in the vehicle-mounted information processing system 20.

The monitoring device 50 controls the operation (such as turning on, turning off, and an imaging range(s)) of one or two or more cameras 55 (imaging devices) that capture the inside of the cargo room 3 or the like. The monitoring device 50 performs, on captured images for monitoring (called "monitoring images") captured by the cameras 55, processing such as converting the format of the monitoring images into a format for transmission to the control center 4. The monitoring images for transmission obtained by the processing are transmitted to the control center 4 via the network N. The control center 4 is able to display the monitoring images on one or two or more display devices (one or two or more screens) according to the number of the monitoring images (the number of static images or video streams). The monitoring person 11 of the control center 4 is able to refer to the monitoring images and monitor the presence or absence of abnormality or the like. The captured images include static images and moving images. The monitoring person 11 is a remote monitoring person.

In the present embodiment, the monitoring device 50 determines whether the delivery person 5 does not exist inside the vehicle 2 (has moved to the outside of the vehicle) on the basis of the reception state of radio waves from the smart key 6 or the like. When determining that the delivery person 5 does not exist inside the vehicle, the monitoring device 50 suppresses the monitoring function of the monitoring device 50.

Figure 2:
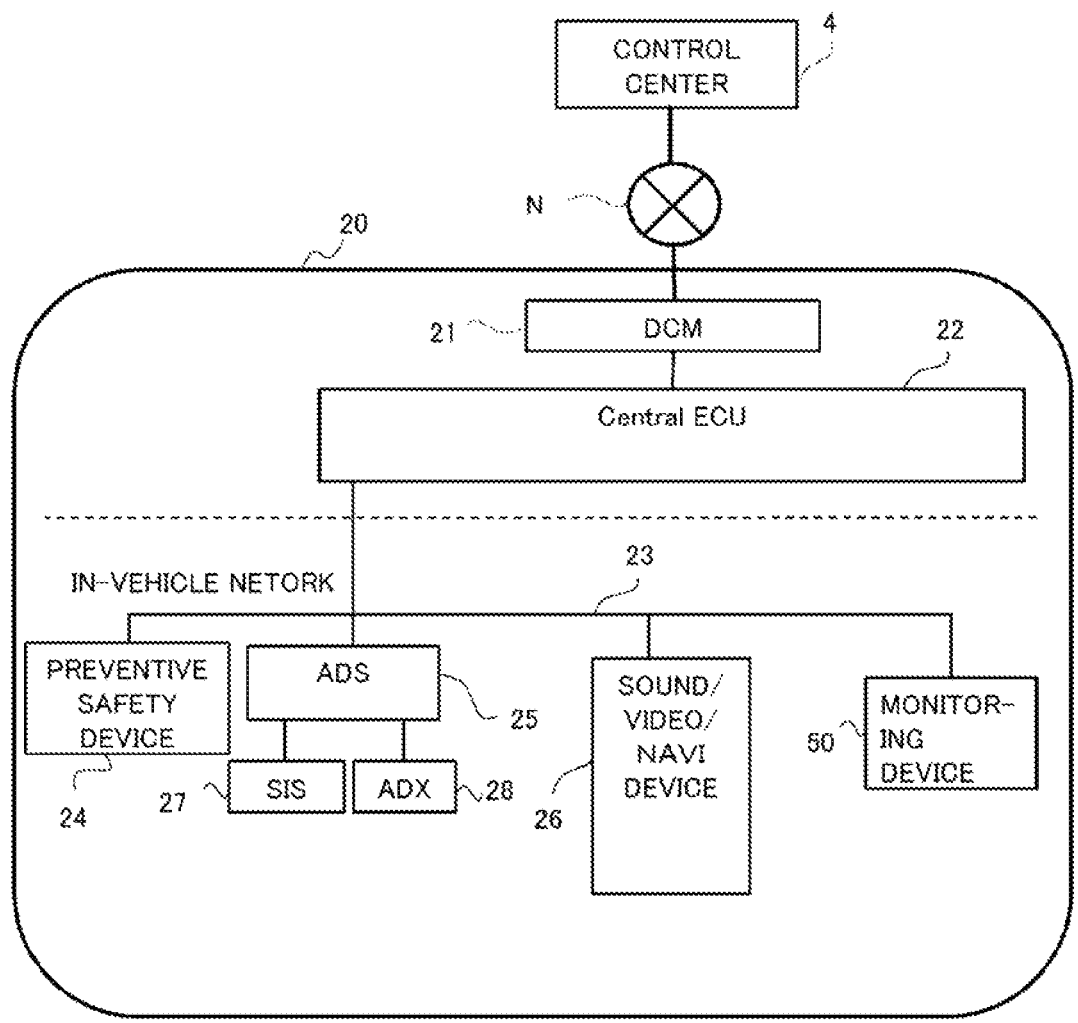
FIG. 2 is a diagram illustrating a configuration example of a vehicle-mounted information processing system shown in FIG. 1.

FIG. 2 is a diagram illustrating a configuration example of the vehicle-mounted information processing system 20 shown in FIG. 1. In FIG. 2, the vehicle 2 includes a Data Communication Module (DCM) 21 and a Central Electrical Control Unit (Central ECU) 22. The Central ECU 22 is connected to a preventive safety device 24 and an Automatic Driving System (ADS) 25 via an in-vehicle network 23 (for example, an in-vehicle LAN (Local Area Network) or the like). Further, the Central ECU 22 is connected to a sound/video/NAVI device 26 and the monitoring device 50 via the in-vehicle network 23.

The DCM 21 is a communication device able to communicate with the control center 4 or the like via the network N. The DCM 21 is able to perform wireless communication via a mobile communication network. The Central ECU 22 manages respective equipment inside the vehicle 2.

The Central ECU 22 has, for example, a processor and a memory. The processor runs a computer program on the memory (hereinafter simply called a "program") and performs processing as the Central ECU 22.

The preventive safety device 24 includes an ECU and performs collision avoidance support processing according to the processing of a program. The preventive safety device 24 performs, for example, collision avoidance support, lane deviation alert, automatic high beam, radar cruise control, or the like on the basis of a signal from the sensor of a radar, a camera, or the like.

The ADS 25 includes an ECU and performs the collection and recognition of information for automatic driving, a determination based on the recognition, the control of the operation of the vehicle 2 based on the determination according to the running of a program. The ADS 25 is connected to Spatial Information Service (SIS) 27, Advanced Drive Extension (ADX) 28, or the like. Each of the SIS 27 and the ADX 28 includes an ECU and performs highly-advanced driving support processing according to the processing of a program. The ADS 25 detects vehicles, three-dimensional objects, or the like around the vehicle 2 according to, for example, a detection signal from Light Detection and Ranging (LiDAR), estimates the position of the vehicle 2 itself, and performs driving control.

The SIS 27 provides the posture, the position on a map, or the like of the vehicle 2 itself to the ADS 25. The SIS 27 acquires position information from a global navigation satellite system (GNSS) or a global positioning system (GPS), a six-axis acceleration signal from a gyro sensor, path information or map information from a navigation system, or the like. The SIS 27 calculates the posture, the position on the map, or the like of the vehicle 2 itself on the basis of the acquired information. The ADX 28 applies an Artificial Intelligence (AI) system, recognizes and processes information from the above various sensors or the like, and notifies the ADS 25 of processing results.

The sound/video/NAVI device 26 includes an ECU and provides various functions based on sound, video, map information, or the like to the user of the vehicle 2 according to the processing of a program.

Configuration of Monitoring Device

Figure 3:
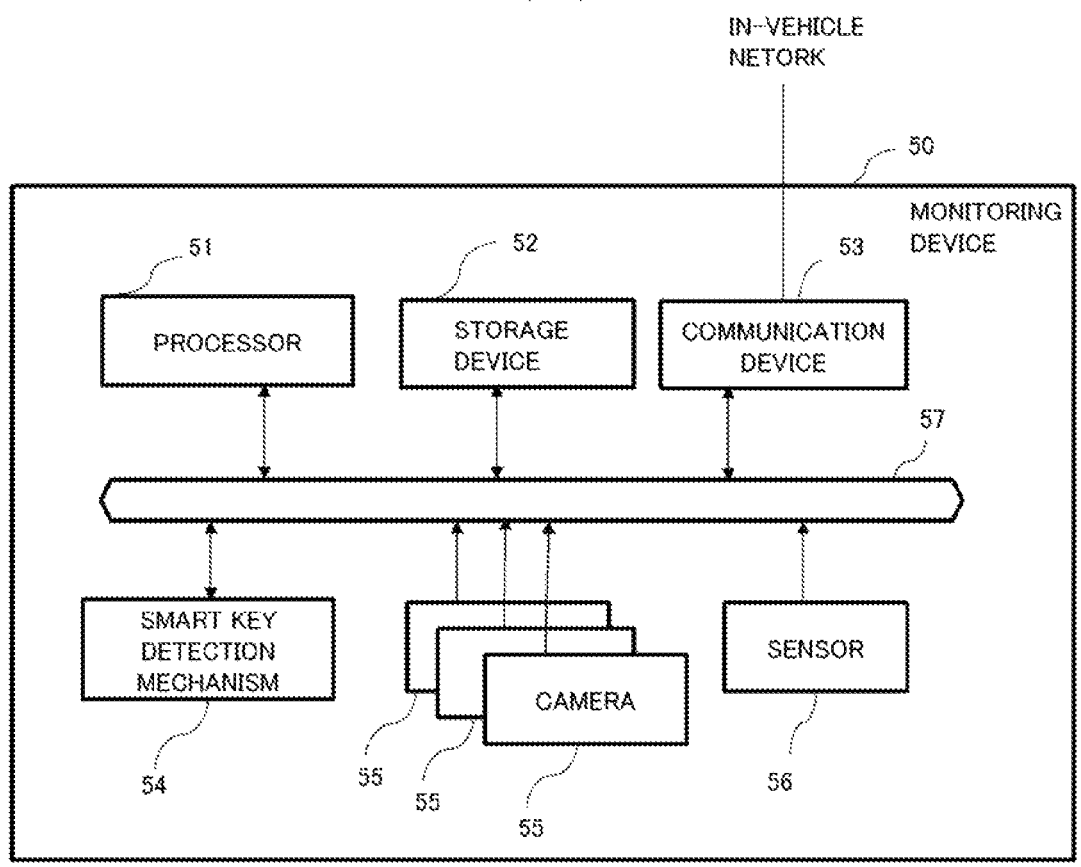
FIG. 3 is a diagram illustrating a configuration example of a monitoring device.

FIG. 3 is a diagram illustrating a configuration example of the monitoring device 50. The monitoring device 50 includes a processor 51 (an example of a "controller" or a "control unit"), a storage device 52, a communication device 53, a smart key detection mechanism 54, cameras 55, and a sensor 56 that are connected to each other via a bus 57. The monitoring device 50 is an example of a "computer" and is positioned in the vehicle 2 in a removable (detachable) or fixed state.

The storage device 52 is an example of a non-transitory storage medium and includes a main storage device and an auxiliary storage device. The main storage device is used as a storage area for a program and data, a development area for a program, a work area for a program, a buffer area for communication data, or the like. The main storage device is constituted by a RAM (Random Access Memory) or a combination of a RAM and a ROM (Read Only Memory). The auxiliary storage device is used as a storage area for data and a program. As the auxiliary storage device, a non-volatile storage medium is applicable. The non-volatile storage medium is, for example, a hard disk, a Solid State Drive (SSD), a flash memory, an EEPROM (Electrically Erasable Programmable Read-Only Memory), or the like.

The communication device 53 is a circuit that performs communication processing. The communication device 53 is, for example, a network interface card (NIC) connected to the in-vehicle network 23 (in-vehicle LAN).

The smart key detection mechanism 54 includes a transmitter that transmits radio waves to the smart key 6 and a receiver that receives radio waves from the smart key 6. The processor 51 is able to calculate the electric field strength or received power of received radio waves using output from the receiver. Note that the monitoring device 50 may employ a configuration in which the calculation result of the electric field strength or the received power is received from the smart key system 40 via the communication device 53 and the in-vehicle network 23. In this case, the smart key detection mechanism 54 is omittable. Note that in the present embodiment, the smart key detection mechanism 54 is provided assuming a case in which the monitoring device 50 is retrofitted to the vehicle 2 (the estimation of the position of the smart key is made possible by an operation independent from (not relying on) the smart key system 40).

In the present embodiment, two or more cameras 55 are prepared. Each of the cameras 55 is arranged to be able to capture a plurality of prescribed positions inside and outside the vehicle 2 such as the cargo room 3, a seat of the delivery person 5, and the vicinity of the door of the vehicle 2. Further, the cameras 55 may have a configuration in which their angles of view and capturing directions are changeable by the processor 51 or the like. The sensor 56 is, for example, a human detection sensor and detects a person (such as the delivery person 5) existing inside the vehicle. A detection method based on a human detection sensor is not particularly limited but a photosensor, a CDS sensor, or the like may be used. Of course, the type of the sensor 56, that is, a physical amount detected by the sensor 56 (the output of the sensor 56) is appropriately changeable depending on a monitoring target.

The processor 51 is, for example, a CPU (Central Processing Unit) or the like. The processor 51 performs various processing by running various programs stored in the storage device 52 or the like. For example, the processor 51 is able to calculate the electric field strength or received power of radio waves received from the smart key 6 from the output of the smart key detection mechanism 54 and determine whether the delivery person 5 exists inside the vehicle from the calculation result. Further, the processor 51 is able to analyze captured images of the cameras 55 and determine whether the delivery person 5 exists inside the vehicle 2. Further, the processor 51 is also able to determine whether the delivery person 5 exists inside the vehicle from the output of the sensor 56. Alternatively, the processor 51 may receive an unlocking signal and a locking signal for the door of the vehicle 2 according to the smart key system 40 via the in-vehicle network 23. The processor 51 may determine that the delivery person 5 has moved to the outside of the vehicle when receiving the locking signal, and determine that the delivery person 5 exists inside the vehicle when receiving the unlocking signal.

The processor 51 suppresses the monitoring function when determining that the delivery person 5 does not exist inside the vehicle, that is, the delivery person 5 has moved to the outside of the vehicle. In the suppression of the monitoring function, the operation of the monitoring device 50 is, for example, stopped (turned off). In the suppression of the monitoring function, all or some of the cameras 55 may be turned off. When some of the cameras 55 are turned off, only one or a few of the cameras that capture the vicinity of the door of the vehicle 2 are, for example, operated. This is because the delivery person 5 returning to the vehicle 2 after completing delivery is found as soon as possible. Since some of the cameras 55 are turned off, the imaging range (monitoring range) of a monitoring image becomes smaller than a case in which the monitoring function is not suppressed. Further, in the suppression of the monitoring function, processing to convert the format of captured images of the cameras 55 into a format for transmission may be turned off, the communication device 53 may be turned off, or the transmission of a monitoring image from the DCM 21 may be stopped.

Further, the processor 51 cancels the suppression of the monitoring function when determining that the delivery person 5 exists inside the vehicle (has returned to the inside of the vehicle) on the basis of the output of at least one of the smart key detection mechanism 54, the cameras 55, and the sensor 56.

Operation Example

Figure 4:
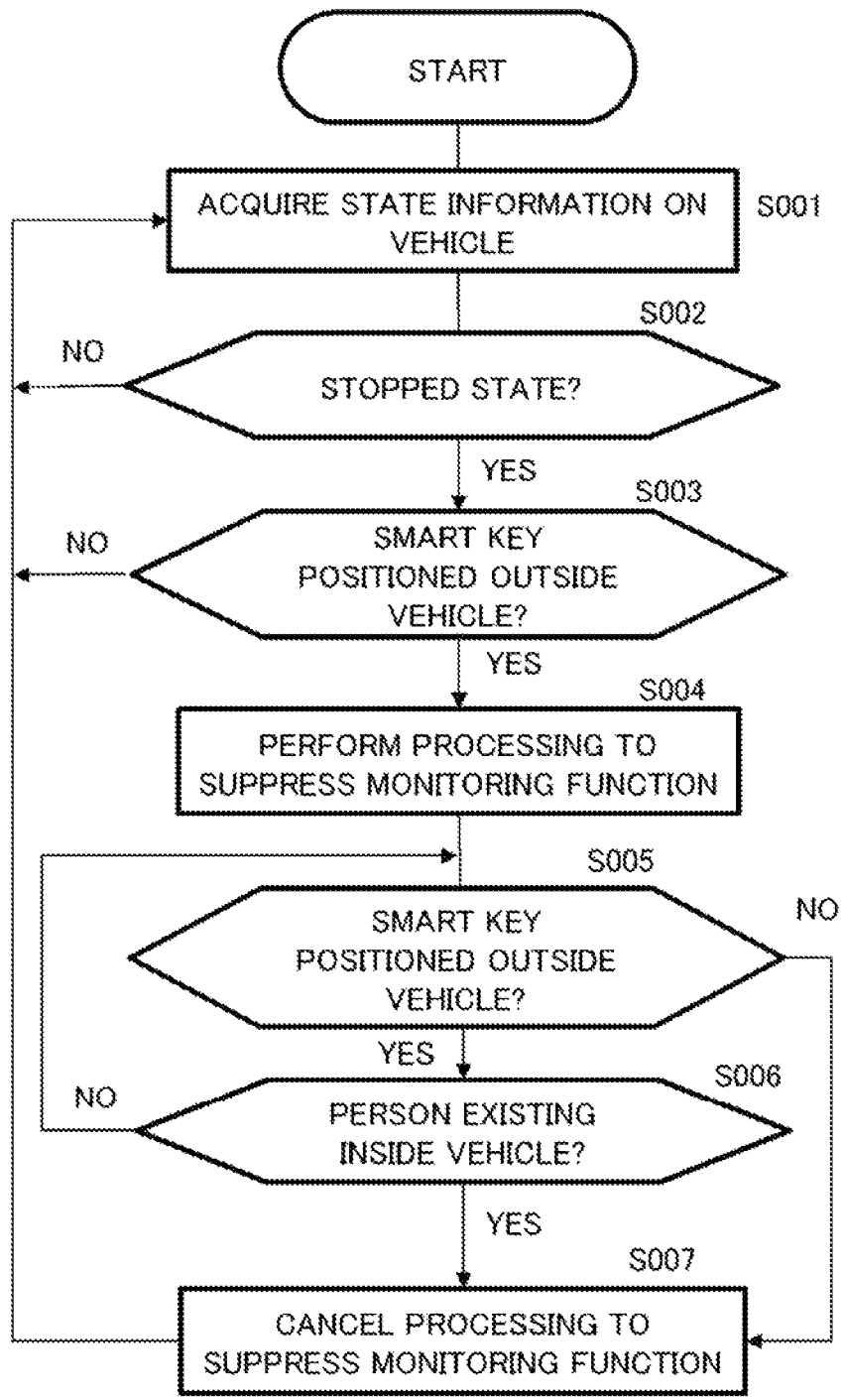
FIG. 4 is a flowchart illustrating an operation example 1.

FIG. 4 is a flowchart illustrating a processing example (operation example 1) of the processor 51 of the monitoring device 50. The monitoring function of the monitoring device 50 is in a non-suppressed state when the flowchart starts.

In step S001, the processor 51 acquires state information on the vehicle 2. That is, the processor 51 makes an inquiry about the state of the vehicle 2 to the Central ECU 22. The Central ECU 22 acquires the information indicating the state of the vehicle from the ADS 25 and transmits the same to the processor 51. In this manner, the processor 51 acquires the information indicating the state of the vehicle 2.

In step S002, the processor 51 determines whether the information indicating the state of the vehicle 2 is the stopped state of the vehicle 2. For example, when the information indicating the state of the vehicle 2 is the applied state of a parking brake, the processor 51 determines that the vehicle 2 is in the stopped state. The processing proceeds to step S003 when it is determined that the vehicle 2 is in the stopped state. Otherwise, the processing returns to step S001. The stopped state may be a state other than the applied state of the parking brake.

In step S003, the processor 51 determines whether the smart key 6 is positioned outside the vehicle. That is, the processor 51 calculates the electric field strength or received power of radio waves from the smart key 6 from the output of the smart key detection mechanism 54 and determines whether the calculation result is a prescribed threshold (stored in the storage device 52 or the like) or less. When it is determined that the calculation result is the threshold or less, the smart key 6 is regarded as being positioned outside the vehicle (the delivery person 5 holding the smart key 6 is outside the vehicle). At this time, the processing proceeds to step S004.

Note that the processing of step S003 may be performed as follows. That is, the processor 51 stores the temporal change (history) of the electric field strength or the received power in the storage device 52 in advance. When a state in which the electric field strength or the received power exceeds the threshold changes to a state in which the electric field strength or the received power becomes the threshold or less in a time zone that is a determination target in the history, the processor 51 determines that the smart key 6 is positioned (exists) outside the vehicle.

When it is determined in step S003 that the calculation result exceeds the threshold, the smart key 6 is regarded as being positioned inside the vehicle (the delivery person 5 is regarded as existing inside the vehicle) and the processing returns to step S001. Note that in step S003, the electric field strength or the received power may be converted into a distance to determine whether the smart key 6 is positioned inside or outside the vehicle on the basis of the length of the distance.

In step S004, the processor 51 performs processing to suppress the monitoring function. That is, the processor 51 performs processing to reduce the number of the cameras 55, two or more of which are used when the monitoring function is not suppressed, to a prescribed number (for example, one). At this time, the processor 51 may turn off all the cameras 55, or may turn off processing to generate a monitoring image for transmission and processing to transmit the monitoring image for transmission to the Central ECU 22.

In step S005, the processor 51 determines whether the smart key 6 is positioned outside the vehicle. The processing here is the same as the processing of step S003. When it is determined that the smart key 6 is positioned outside the vehicle, the processing proceeds to step S006. Otherwise, the processing proceeds to step S007 to perform processing to handle a case in which the delivery person 5 has returned to the inside of the vehicle.

Note that the processing of step S005 may be performed as follows. That is, the processor 51 stores the temporal change (history) of the electric field strength or the received power in the storage device 52 in advance. When a state in which the electric field strength or the received power is the threshold or less changes to a state in which the electric field strength or the received power exceeds the threshold in a time zone that is a determination target in the history, the processor 51 determines that the smart key 6 is positioned (exists) inside the vehicle.

In step S006, the processor 51 determines whether a person exists inside the vehicle. That is, the processor 51 determines whether a person exists inside the vehicle by the analysis of captured images of the cameras 55 or by the analysis of the output of the sensor 56. This is because the processor 51 detects a case in which a suspicious person or the like may intrude into the vehicle when the delivery person 5 is absent. The processing proceeds to step S007 when it is determined that a person exists inside the vehicle. Otherwise, the processing returns to step S005.

In step S007, the processor 51 cancels the processing to suppress the monitoring function to restore to a state in which the monitoring function is not suppressed. After that, the processing returns to step S001. Note that the processing of step S006 is optional.

Figure 5:
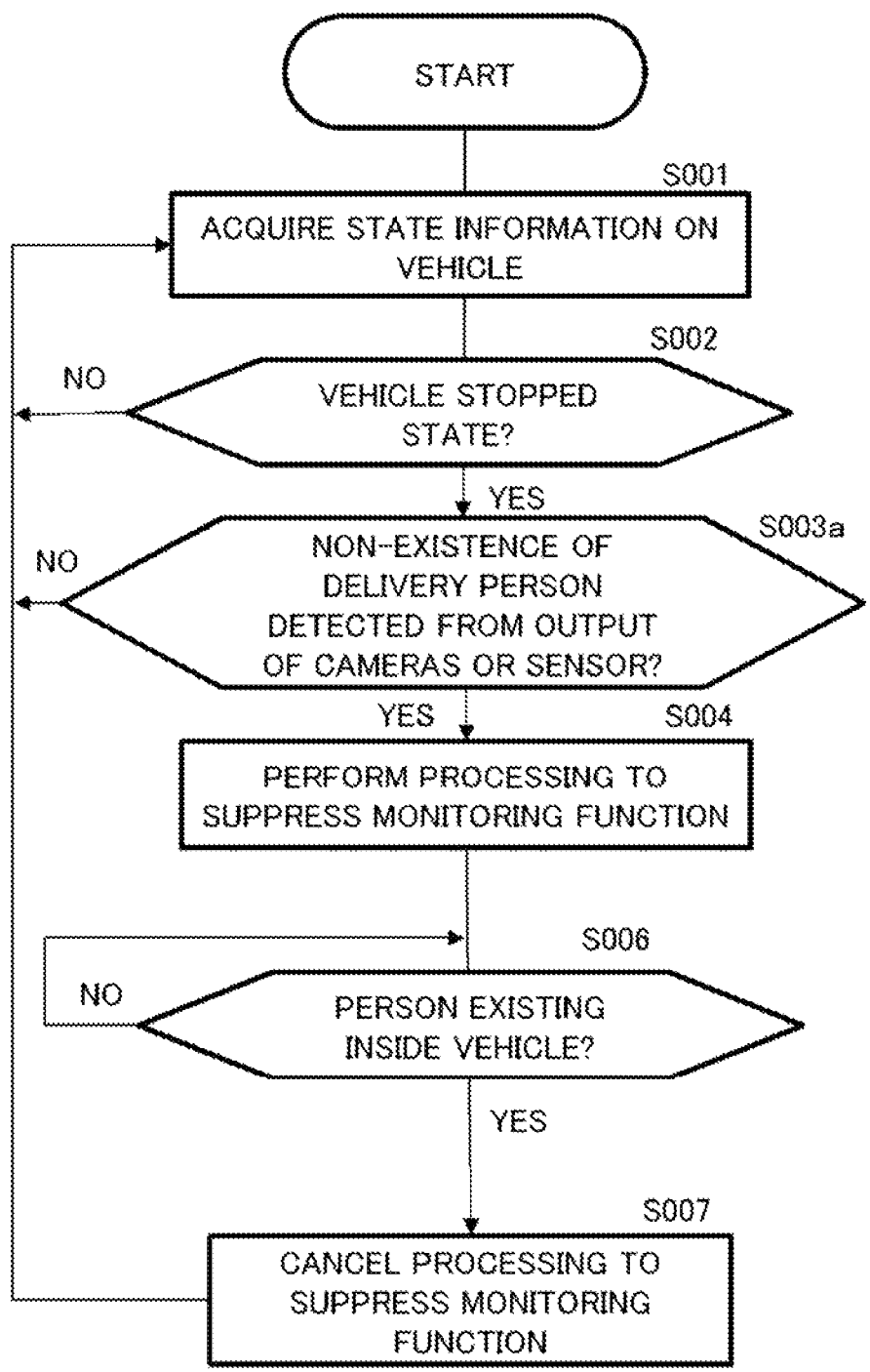
FIG. 5 is a flowchart illustrating an operation example 2.

FIG. 5 is a flowchart illustrating a processing example (operation example 2) of the processor 51 of the monitoring device 50. The monitoring function of the monitoring device 50 is in a non-suppressed state when the flowchart starts. In comparison with the processing (FIG. 4) of the operation example 1, the processing of FIG. 5 is different from the processing of FIG. 4 in that (1) step S003a is provided instead of step S003 and (2) step S005 is omitted. Therefore, step S003a will be described, and the descriptions of other steps will be omitted.

In step S003a, the processor 51 performs at least one of the analysis of the output (captured images) of the cameras 55 and the analysis of the output of the sensor 56 and determines whether a person (the delivery person 5) exists inside the vehicle. At this time, when a person is reflected in the captured images, the processor 51 may determine whether the person is the delivery person 5 according to an image analysis (discrimination of the color or design of clothing or the like). Further, the processor 51 may determine whether the person is the delivery person 5 by a combination of the output of a plurality of or a plurality of types of sensors 56. Then, when it is determined that the person (delivery person 5) does not exist inside the vehicle, the processing proceeds to step S004. Otherwise, the processing returns to step S001. As in the operation example 2, a determination using the output of at least one of the cameras 55 and the sensor 56 may be made instead of a determination using radio waves from the smart key 6.

FIG. 6 is a flowchart illustrating a processing example (operation example 3) of the processor 51 of the monitoring device 50. The monitoring function of the monitoring device 50 is in a non-suppressed state when the flowchart starts. In comparison with the processing (FIG. 4) of the operation example 1, step S003a is inserted between step S003 and step S004 in the processing of FIG. 6. Since the details of respective steps are the same as those of the operation examples 1 and 2, their descriptions will be omitted. As in the operation example 3, both a determination using radio waves from the smart key 6 and a determination using the output of at least one of the cameras 55 and the sensor 56 may be made to increase accuracy in determining whether a person exists inside the vehicle.

Note that the operation examples 1 to 3 show operation examples of the processor 51 but the processing performed by the processor 51 may be performed by the Central ECU 22. In this case, the processor 51 transmits the respective output of the smart key detection mechanism 54, the cameras 55, and the sensor 56 to the Central ECU 22. Further, the suppression of the monitoring function and the cancel of the suppression are performed by the processor 51 according to instructions from the Central ECU 22. Alternatively, the Central ECU 22 may stop the transmission of a monitoring image to the DCM 21 to suppress the monitoring function. Further, monitoring by the monitoring device 50 is performed in such a manner as to capture a monitoring image and transmit the same to the control center 4. However, the output of the sensor 56 that monitors one or a plurality of targets or the output of a plurality of types of sensors 56 may be transmitted to the control center 4 so that the monitoring person 11 performs monitoring using information obtained from the output of the sensor(s) 56. In this case, the suppression of the monitoring function is performed by stopping the transmission of the output of the sensor(s) 56. Further, monitoring may be performed using a monitoring image and sensor output. In this case, it is possible to perform the suppression by stopping the transmission of at least one of the monitoring image and the sensor output or the like.

Function and Effect of Embodiment

In the embodiment, the vehicle 2 is a delivery automatic driving vehicle with the monitoring device 50 for remote monitoring. In the vehicle 2, the vehicle-mounted information processing system 20 is mounted as an information processing apparatus. The processor 51 (or the Central ECU 22) included in the vehicle-mounted information processing system 20 suppresses the monitoring function of the monitoring device 50 when determining that the delivery person 5 does not exist inside the vehicle 2 in the stopped state of the vehicle 2. As a result of the suppression, a monitoring image is not transmitted to the control center 4 or a monitoring image where an imaging range is reduced (the number of the cameras 55 is reduced) is transmitted to the control center 4. Accordingly, when the delivery person 5 does not exist inside the vehicle 2, the monitoring person 11 is not required to perform monitoring with a monitoring image or is only required to perform monitoring with a reduced monitoring screen. As described above, it is possible to reduce a burden on the monitoring person 11.

In the embodiment, the processor 51 serving as a controller may determine that the delivery person 5 does not exist inside the vehicle 2 in the stopped state of the vehicle 2 when determining that the smart key 6 of the vehicle 2 is not positioned inside the vehicle 2 in the stopped state of the vehicle 2 (S003 of FIG. 4). That is, the processor 51 may determine whether the delivery person 5 exists inside the vehicle using radio waves from the smart key 6.

The processor 51 may determine that the smart key 6 is positioned outside the vehicle when the history of the electric field strength or received power of radio waves of the smart key 6 shows the movement of the smart key 6 from the inside to the outside of the vehicle 2 in the stopped state of the vehicle 2 (S003). Then, the processor 51 may suppress the monitoring function according to the determination (S004). By determining whether the smart key 6 is positioned inside or outside the vehicle from the history rather than making a determination based on one calculation result, the processor 51 is able to increase determination accuracy.

Further, the processor 51 may determine that the smart key 6 has moved from the outside to the inside of the vehicle from, for example, the history of the electric field strength or received power of radio waves of the smart key 6 (S005 of FIG. 4). Then, the processor 51 may cancel the suppression of the monitoring function according to the determination (S007).

Further, the processor 51 may suppress the monitoring function (S004) when determining that a delivery person does not exist inside the vehicle 2 from at least one of a captured image obtained by capturing the inside of the vehicle 2 and the output of the sensor 56 in the stopped state of the vehicle 2 (S003a of FIG. 5).

Further, in the present embodiment, the monitoring device 50 captures an image for monitoring (monitoring image) of the vehicle 2 when the monitoring function is in a non-suppressed state. In the suppressed state of the monitoring function, the processor 51 makes the imaging range of an image for monitoring smaller than that of an image for monitoring in the non-suppressed state. For example, the processor 51 reduces the number of the cameras 55 that capture an image. Thus, the processor 51 is able to suppress the monitoring function (S004). As a result of a reduction in an imaging range for monitoring, a range in which the monitoring person 11 refers to a monitoring image to perform monitoring is reduced. Therefore, a burden on the monitoring person 11 is reduced. In the reduction of an imaging range, the angle of view of a monitoring image may be reduced to reduce a monitoring target reflected in the monitoring image. In the suppression of the monitoring function (S004), capturing of a monitoring image may be stopped or processing of a captured monitoring image (conversion of the size or format of the monitoring image into the size or format thereof for transmission) may be stopped. Since the monitoring image is not normally transmitted as a result of the stop of the processing, the control center 4 becomes unable to normally display the monitoring image. When the monitoring person 11 recognizes the unnecessity of monitoring and does not perform monitoring on the basis of the state, it is possible to reduce a burden on the monitoring person 11. Further, in the suppression of the monitoring function, the transmission of a monitoring image may be stopped.

Further, in the suppressed state of the monitoring function, the processor 51 may cancel the suppression of the monitoring function when determining that a person exists inside the vehicle 2 in a state in which the smart key 6 is positioned outside the vehicle. Thus, the processor 51 is able to resume monitoring when an object other than the delivery person 5 intrudes into the vehicle.

Others

The above embodiment shows only an example, and the present disclosure may be appropriately changed to be carried out within the range of its gist. Further, the processing described as being performed by one device may be performed by a plurality of devices in a shared manner. Alternatively, the processing described as being performed by different devices may be performed by one device. In a computer system, it is possible to flexibly change a hardware configuration (server configuration) to realize respective functions.

The present disclosure is also realizable in such a manner that a computer program in which the function described in the above embodiment is installed is supplied to a computer and one or more processors provided in the computer read and run the program. The computer program may be provided to a computer via a non-transitory computer-readable storage medium connectable to the system bus of the computer, or may be provided to the computer via a network. The non-transitory computer-readable storage medium is, for example, any type of a disk such as a magnetic disk (such as a Floppy™ disk and a hard disk drive (HDD)) and an optical disk (such as a CD-ROM, a DVD disk, and a Blu-ray disk). Further, the non-transitory computer-readable storage medium includes a read-only memory (ROM), a random access memory (RAM), an EPROM, an EEPROM, a magnetic card, a flash memory, an optical card, and any type of a medium suitable for storing electronic instructions.

What is claimed is:

1. An information processing apparatus mounted in a delivery automatic driving vehicle with a monitoring device that controls an operation of a plurality of imaging devices for remote monitoring, the plurality of imaging devices being arranged at a plurality of positions inside and outside the automatic driving vehicle, the information processing apparatus comprising:
a controller that controls the monitoring device to turn off a part of the plurality of imaging devices and turn on the rest of the plurality of imaging devices at the same time for suppressing a monitoring function of the monitoring device when determining that a delivery person does not exist inside the automatic driving vehicle in a stopped state of the automatic driving vehicle and to turn on all of the plurality of imaging devices for cancelling suppression of the monitoring function when determining that the delivery person exists inside the automatic driving vehicle in the stopped state of the automatic driving vehicle.

2. The information processing apparatus according to claim 1, wherein the controller determines that the delivery person does not exist inside the automatic driving vehicle when determining that a smart key of the automatic driving vehicle is not positioned inside the automatic driving vehicle.

3. The information processing apparatus according to claim 2, wherein the controller determines that the smart key is not positioned inside the automatic driving vehicle when a history of electric field strength or received power of radio waves from the smart key shows movement of the smart key from an inside to an outside of the automatic driving vehicle.

4. The information processing apparatus according to claim 2, wherein the controller cancels the suppression of the monitoring function of the monitoring device when determining that the smart key has moved from an outside to an inside of the automatic driving vehicle.

5. The information processing apparatus according to claim 1, wherein the controller determines that the delivery person does not exist inside the automatic driving vehicle on a basis of a captured image obtained by capturing an inside of the automatic driving vehicle using the plurality of imaging devices or output of a sensor in the stopped state.

6. The information processing apparatus according to claim 1, wherein when the monitoring device captures an image for monitoring of the automatic driving vehicle using the plurality of imaging devices in a non-suppressed state of the monitoring function, the controller makes an imaging range of the image for monitoring in the suppressed state of the monitoring function smaller than an imaging range of the image for monitoring in the non-suppressed state.

7. The information processing apparatus according to claim 2, wherein when determining that a person exists inside the automatic driving vehicle in a state in which the smart key is positioned outside the automatic driving vehicle, the controller cancels the suppression of the monitoring function in the suppressed state of the monitoring function.

8. An information processing method performed by an information processing apparatus mounted in a delivery automatic driving vehicle with a monitoring device that controls an operation of a plurality imaging devices for remote monitoring, the plurality of imaging devices being arranged at a plurality of positions inside and outside the automatic driving vehicle, the information processing method comprising:
controlling the monitoring device to turn off a part of the plurality of imaging devices and turn on the rest of the plurality of imaging devices at the same time for suppressing a monitoring function of the monitoring device when the information processing apparatus determines that a delivery person does not exist inside the automatic driving vehicle in a stopped state of the automatic driving vehicle; and
controlling the monitoring device to turn on all of the plurality of imaging devices for cancelling suppression of the monitoring function when determining that the delivery person exists inside the automatic driving vehicle in the stopped state of the automatic driving vehicle.

9. The information processing method according to claim 8, wherein the information processing apparatus determines that the delivery person does not exist inside the automatic driving vehicle when determining that a smart key of the automatic driving vehicle is not positioned inside the automatic driving vehicle.

10. The information processing method according to claim 9, wherein the information processing apparatus determines that the smart key is not positioned inside the automatic driving vehicle when a history of electric field strength or received power of radio waves from the smart key shows movement of the smart key from an inside to an outside of the automatic driving vehicle.

11. The information processing method according to claim 10, wherein the information processing apparatus cancels the suppression of the monitoring function of the monitoring device when determining that the smart key has moved from an outside to an inside of the automatic driving vehicle.

12. The information processing method according to claim 8, wherein the information processing apparatus determines that the delivery person does not exist inside the automatic driving vehicle on a basis of a captured image obtained by capturing an inside of the automatic driving vehicle using the plurality of imaging devices or output of a sensor in the stopped state.

13. The information processing method according to claim 8, wherein when the monitoring device captures an image for monitoring of the automatic driving vehicle using the plurality of imaging devices in a non-suppressed state of the monitoring function, the information processing apparatus makes an imaging range of the image for monitoring in the suppressed state of the monitoring function smaller than an imaging range of the image for monitoring in the non-suppressed state.

14. A non-transitory storage medium storing a program that causes a computer mounted in a delivery automatic driving vehicle with a monitoring device that controls an operation of a plurality imaging devices for remote monitoring, the plurality of imaging devices being arranged at a plurality of positions inside and outside the automatic driving vehicle, to control the monitoring device to turn off a part of the plurality of imaging devices and turn on the rest of the plurality of imaging devices at the same time for suppressing a monitoring function of the monitoring device when determining that a delivery person does not exist inside the automatic driving vehicle in a stopped state of the automatic driving vehicle and to turn on all of the plurality of imaging devices for cancelling suppression of the monitoring function when determining that the delivery person exists inside the automatic driving vehicle in the stopped state of the automatic driving vehicle.

15. The non-transitory storage medium according to claim 14, wherein the program causes the computer to determine that a person does not exist inside the automatic driving vehicle when determining that a smart key of the automatic driving vehicle is not positioned inside the automatic driving vehicle.

16. The non-transitory storage medium according to claim 15, wherein the program causes the computer to determine that the smart key is not positioned inside the automatic driving vehicle when a history of electric field strength or received power of radio waves from the smart key shows movement of the smart key from an inside to an outside of the automatic driving vehicle.

17. The non-transitory storage medium according to claim 16, wherein the program causes the computer to cancel the suppression of the monitoring function of the monitoring device when determining that the smart key has moved from an outside to an inside of the automatic driving vehicle.

18. The non-transitory storage medium according to claim 14, wherein the program causes the computer to determine that the delivery person does not exist inside the automatic driving vehicle on a basis of a captured image obtained by capturing an inside of the automatic driving vehicle using the plurality of imaging devices or output of a sensor in the stopped state.

19. The information processing apparatus according to claim 1, wherein the controller turns on at least one imaging device arranged at a position outside the automatic driving vehicle and configured to capture the vicinity of a door of the automatic driving vehicle as the rest of the plurality of imaging devices.

20. The information processing method according to claim 8, wherein the information processing apparatus turns on at least one imaging device arranged at a position outside the automatic driving vehicle and configured to capture the vicinity of a door of the automatic driving vehicle as the rest of the plurality of imaging devices.

21. The non-transitory storage medium according to claim 14, wherein the program causes the computer to turn on at least one imaging device arranged at a position outside the automatic driving vehicle and configured to capture the vicinity of a door of the automatic driving vehicle as the rest of the plurality of imaging devices.

* * * * *